United States Patent [19]
Kelly

[11] Patent Number: 5,861,994
[45] Date of Patent: Jan. 19, 1999

[54] MODULAR BINOCULAR ELECTRONIC IMAGING SYSTEM

[76] Inventor: Shawn L. Kelly, 8479 Pine Cove Dr., Commerce Township, Mich. 48382

[21] Appl. No.: 823,617

[22] Filed: Mar. 25, 1997

Related U.S. Application Data

[63] Continuation of Ser. No. 334,138, Nov. 4, 1994, abandoned.

[51] Int. Cl.$^6$ .................................................. G02B 27/14
[52] U.S. Cl. ........................... 359/630; 359/480; 359/481
[58] Field of Search ..................................... 359/630, 375, 359/407, 480, 481, 133; 345/8

[56] References Cited

U.S. PATENT DOCUMENTS

| | | | |
|---|---|---|---|
| 4,575,722 | 3/1986 | Anderson | 340/783 |
| 4,902,116 | 2/1990 | Ellis | 359/480 |
| 4,968,117 | 11/1990 | Chern et al. | 350/162.24 |
| 5,035,474 | 7/1991 | Moss et al. | 350/3.7 |
| 5,124,821 | 6/1992 | Antier et al. | 359/14 |
| 5,343,313 | 8/1994 | Fergason | 359/630 |
| 5,392,158 | 2/1995 | Tosaki | 359/630 |
| 5,414,544 | 5/1995 | Aoyagi et al. | 345/8 |
| 5,467,271 | 11/1995 | Abel et al. | 364/420 |
| 5,485,172 | 1/1996 | Sawachika et al. | 345/8 |

FOREIGN PATENT DOCUMENTS

| | | | |
|---|---|---|---|
| 227953 | 12/1994 | United Kingdom | 345/8 |

OTHER PUBLICATIONS

International Symposium Digest of Technical Papers, New York, 1973, Patrick D. Pratt, "A Helmet–Mounted Camera and Display System for Pilot Training", Fig. 3.

*Primary Examiner*—Timothy P. Callahan
*Assistant Examiner*—Jung Ho Kim
*Attorney, Agent, or Firm*—Lyon, P.C.

[57] ABSTRACT

A portable, electronic imaging system (100) includes a compact housing (102) extending across and beyond the eyes of the user, a wide field of view binocular viewfinder imaging subsystem (104) operating on an image produced by an electronic display subsystem (104) located within the housing, speakers (106) integrally mounted with the housing, an internal, interactive electronic control subsystem (108) to control the functions of the system, and an external input/output interface (110) to facilitate connection with a plurality of optional external devices and/or modules. The housing may further provide for modular mounting and removal of a plurality of optional system modules such as the electronic camera (120), a video tape record and playback device and battery (122), the electronic display (118), a night vision camera, a television tuner, a video game electronic system, a head orientation and position tracking device, or a means for mounting the system on the user's head.

29 Claims, 4 Drawing Sheets

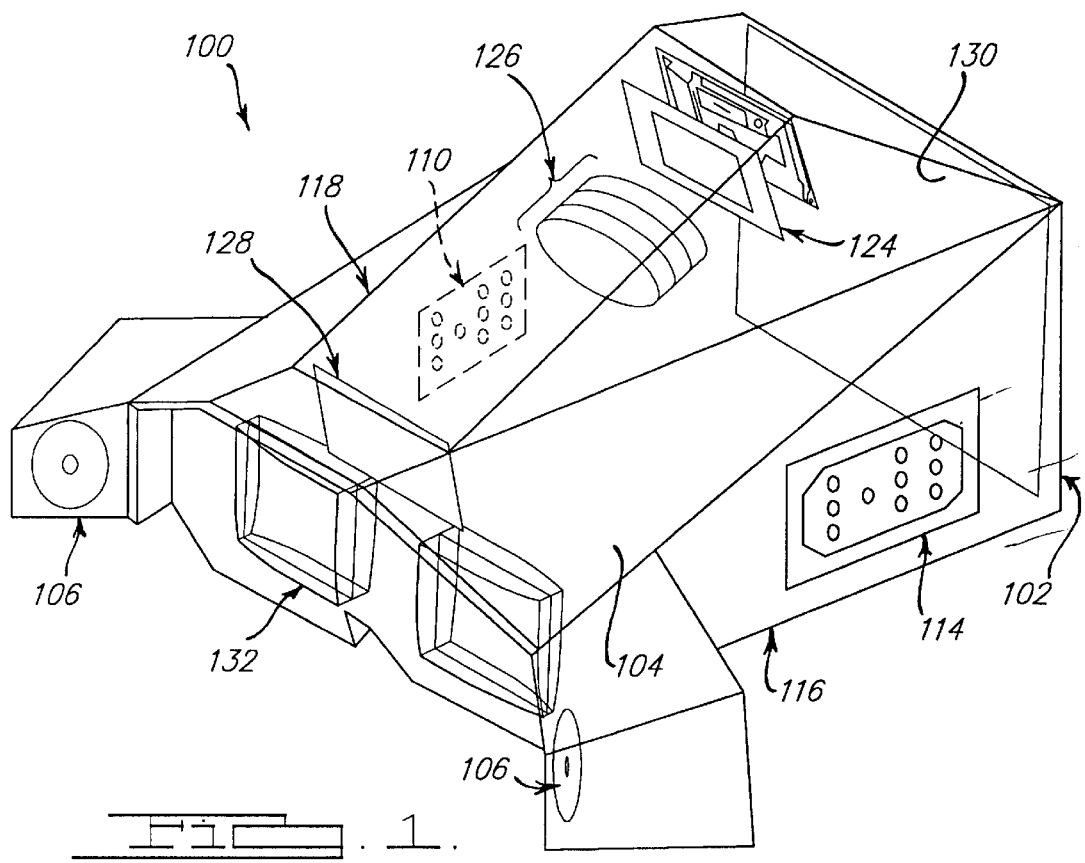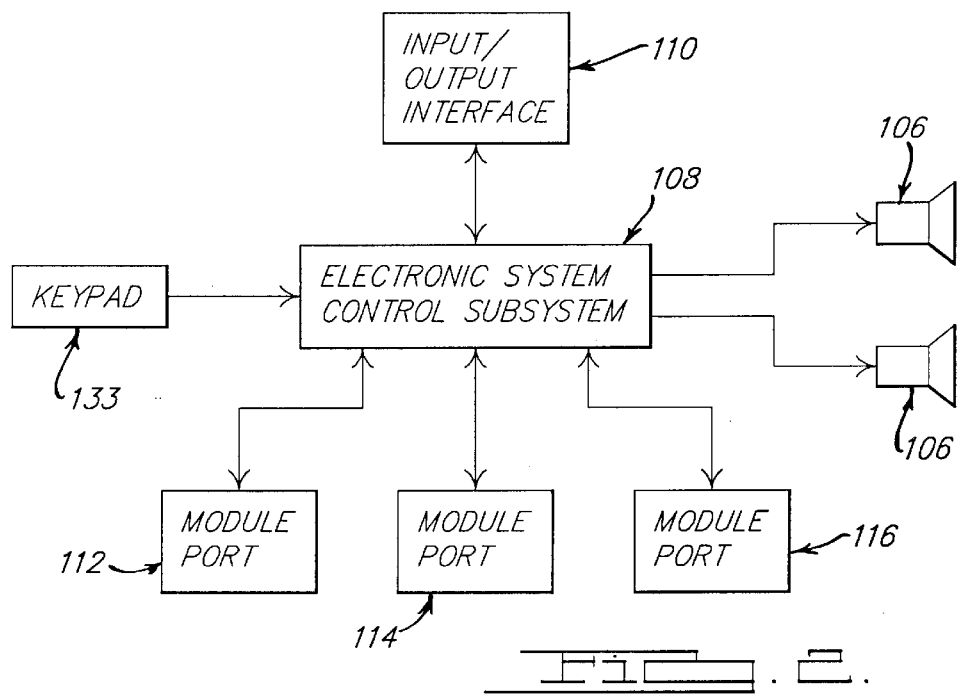

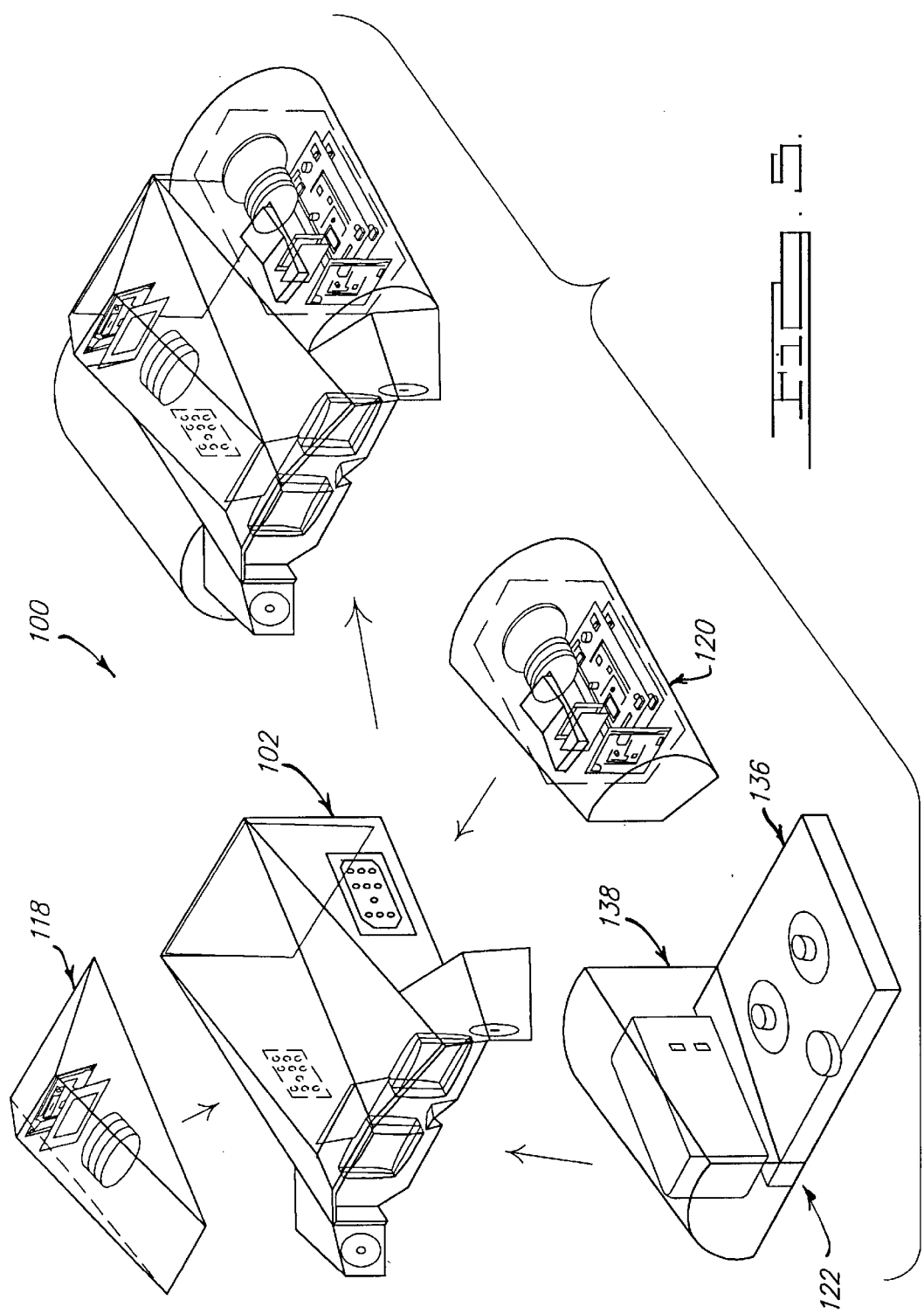

MODULAR BINOCULAR ELECTRONIC IMAGING SYSTEM

This application is a continuation of application Ser. No. 08/334,138 filed on Nov. 4, 1994 abandoned.

SUMMARY OF THE INVENTION

The present invention relates generally to portable imaging systems, and more particularly to a portable imaging system which produces a wide field of view and has a versatile design.

BACKGROUND OF THE INVENTION

Portable electronic imaging systems employing an electronic image display internal to an optical viewing assembly are well known and are generally designed for two primary applications. The most common is the camcorder, comprising a monocular viewfinder to provide a magnified virtual view of the recorded scene. Such viewfinders provide only a limited apparent field of view and a limited exit pupil and eye relief, and further limit viewing to one eye, resulting in an inconvenient configuration for the user and limited utility for other applications. One solution to this problem has been to replace the viewfinder with a larger flat television display. This solution provides comfortable viewing by both eyes with no exit pupil and eye relief restrictions. However, a large display costs and weighs significantly more than the conventional viewfinder, requires a great amount of battery power, and also provides only a limited field of view.

The second common application of optical viewing assemblies in electronic imaging systems is the head mounted display for night vision or virtual reality applications. Typically employing a binocular or biocular optical system to view one or two display panels, such systems generally provide wider fields of view (i.e., greater than approximately 40°) and larger exit pupils than camcorder viewfinders by employing more elaborate and expensive optical systems, larger display panels, or both. However, the greater cost of such systems combined with the limited utility of head mounted displays results in restricted markets and subsequently in restricted development and production resources.

Another significant problem which is common to both such portable electronic imaging systems is their limited utility, thereby restricting one application from sharing in the benefits of another. Simply stated, camcorders can not realistically enjoy the advantages of head mounted display imaging systems because such systems are too elaborate or too expensive. Conversely, head mounted display systems inherently do not benefit from the large market demand and the subsequent resources of the camcorder industry.

These imaging systems further share an inability to be upgraded with advances in display technology, requiring the user to purchase an entire new imaging system to exploit such advances.

Finally, it is well known that camcorders exhibit many characteristics which are often undesirable, including excessive weight, size, cost and incompatibility with different tape formats. Current camcorders also provide only monaural sound, requiring separate headphones to listen to the stereo capabilities inherent in such systems. Current camcorders also require the user to manage the camcorder's weight significantly from their body, causing greater fatigue than if one's hands are maintained more closely. Further, the narrow viewfinders of most camcorders may represent particular danger to the user's eye if the camcorder is bumped or if the user is in a dynamic situation. Such viewfinders also are inconvenient and sometimes difficult to use by people who wear eyeglasses.

SUMMARY OF THE INVENTION

It is therefore an object of the present invention to provide a reconfigurable or multiple use portable electronic imaging system which overcomes the above stated problems.

It is a further object of the present invention to provide a portable electronic imaging system which accommodates upgrades in display technology.

It is a further object of the present invention to provide a versatile camcorder having lighter weight, lower cost, and improved utility and compatibility.

It is a further object of the present invention to provide a portable electronic imaging system which further provides wide field of view imaging and decreased risk of injury to the user's eyes.

It is a further object of the present invention to provide a portable electronic imaging system which has greater buoyancy in water.

It is a further object of the present invention to provide a camcorder having a binocular viewfinder capable of accommodating use by people who wear eyeglasses.

It is a further object of the present invention to provide a modular binocular head mounted display apparatus.

In accordance with a first aspect of the present invention, a reconfigurable, portable electronic imaging system comprises a base imaging subsystem comprising an electronic system control means and a viewfinder means mounted within a main housing. The main housing is provided with a plurality of module connector ports externally arranged to facilitate detachable physical connection of a corresponding plurality of optional external system modules to the base imaging subsystem, wherein each of the plurality of optional external system modules comprises a module subsystem for either generating, processing, displaying, or recording an image, and wherein the base imaging subsystem reimages such image for viewing by a system user.

In accordance with another aspect of the present invention, an electronic imaging system comprises a portable housing, means for generating an electronic image representative of scenery external to the housing, an electronic display means supported by the housing for displaying the electronically generated image within the housing, and a binocular viewfinder means supported by the housing for reimaging the displayed image for viewing by both eyes of a user. The binocular viewfinder means comprises an imaging means for producing an apparent field of view of at least approximately 40°.

Further stated, the present invention provides a portable electronic binocular imaging system having a compact housing extending across and beyond the eyes of the user, a central, wide field of view binocular viewfinder operating on an integral electronic display, an integral electronic video camera, stereo speakers mounted bilaterally on the left and right ends of the housing, an internal, interactive electronic control subsystem to control the overall operation of the system; and an external interface to connect the various system inputs and outputs from and to external devices. The system may further include an integral electronic tape record and playback device with a suitable battery. Also, in accordance with another novel aspect of the present invention, the housing may further or alternatively provide for modular mounting and removal of several system or accessory modules including the electronic camera, the tape record and playback device and battery, a replacement electronic display, a night vision camera, a television tuner, a video game electronic system, a system orientation tracking arrangement, a head orientation and position tracking device, or a means for mounting the system on the user's head. The electronic display and internal electronic control subsystem may include means capable of providing viewing of two image sources simultaneously as a picture-in-picture arrangement or an entire overlap arrangement with the user determining the content and relative dominance (in the case of image overlap) of the respective images.

The present invention will be more fully understood upon reading the following detailed description of the preferred embodiment in conjunction with the accompanying drawings.

BRIEF DESCRIPTION OF THE DRAWINGS

FIG. 1 is a perspective view illustrating a portable main housing/base imaging subsystem, and a display module coupled therewith in accordance with the present invention;

FIG. 2 is a diagram of the electronic control circuitry for the portable electronic imaging system of the present invention;

FIG. 5 is an exploded perspective view illustrating the connection of several different optional external modules to the main housing in accordance with the present invention.

DETAILED DESCRIPTION OF THE PREFERRED EMBODIMENT(S)

Figure 3A:
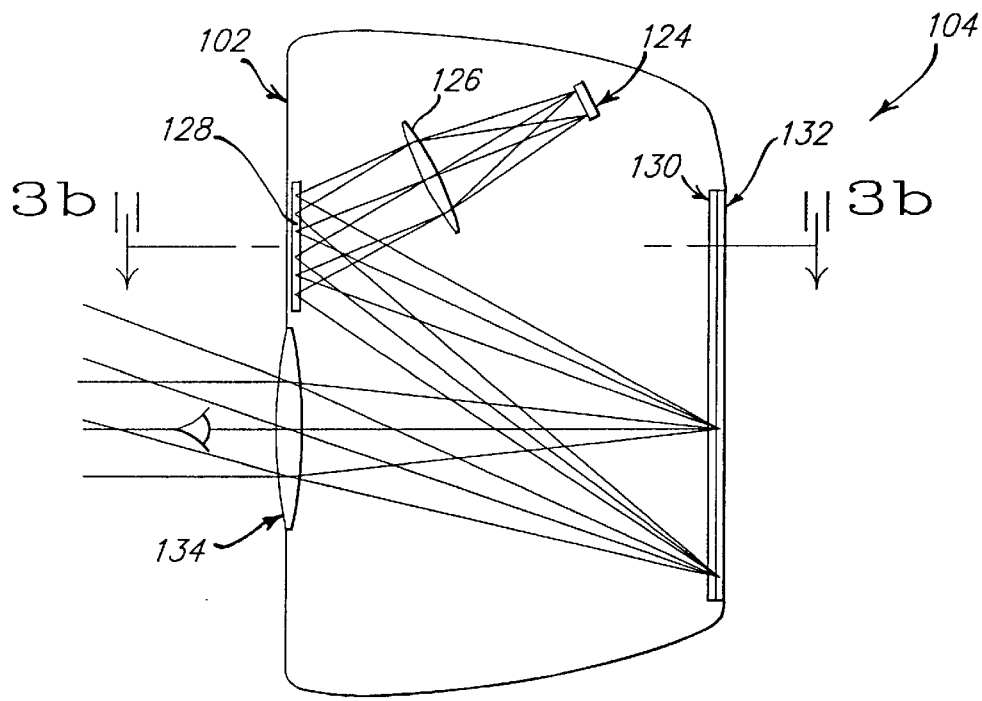
FIGS. 3(a) and 3(b) and are an upper and side perspective view showing a diagrammatic illustration of the preferred binocular viewfinder system of the present invention.
Figure 3B:
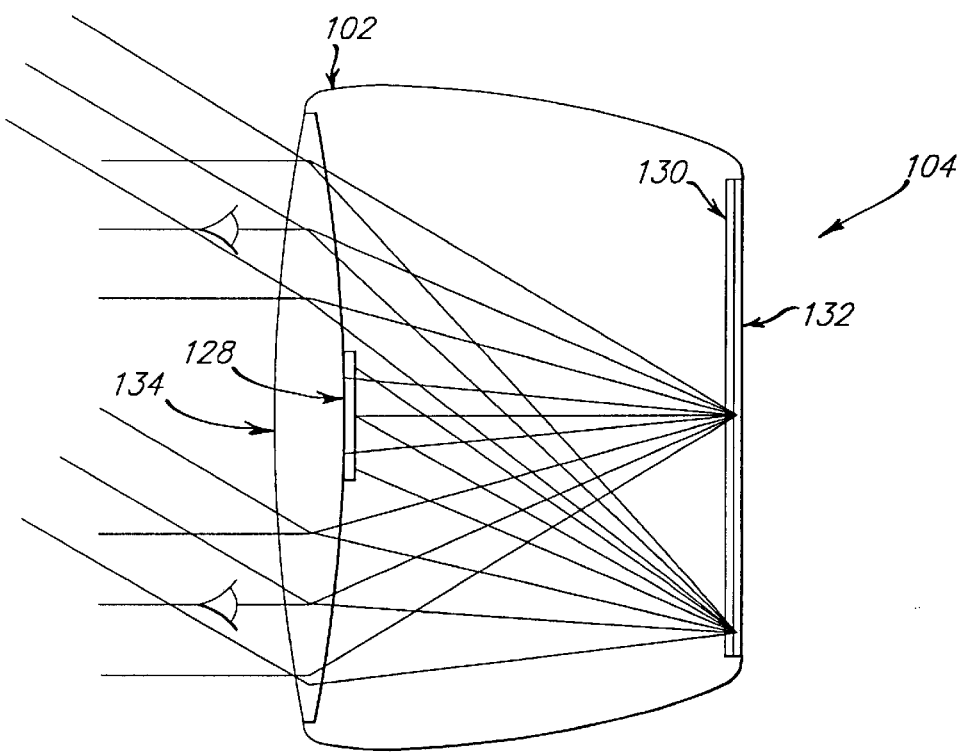

A portable binocular electronic imaging system 100 of the present invention is shown in FIGS. 1–5 as having a main or core system housing 102 containing a binocular viewfinder denoted as binocular viewing subsystem 104, stereo speakers 106, an internal electronic control subsystem 108, a general purpose external input/output interface 110, such as an audio/video jack or a joystick port, and several ports 112, 114, and 116 (which is not actually shown in FIG. 1, but is generally denoted by pointing to the underside of housing 102 where port 116 would be located) for physically and electronically connecting respective accessory modules shown separately in FIG. 5 as a display module 118, an electronic camera module 120, and a battery and video cassette recorder module 122.

The binocular viewing subsystem 104 can be implemented in any manner known to one of ordinary skill in the art which suitably provides an optical subsystem which when configured with the display module 118 provides a binocular wide apparent field of view of the image produced by the display module 118 for viewing by both eyes of the user. In accordance with the present invention, a wide apparent field of view is generally understood to mean a field of view greater than an approximately 40° arc across the viewing field relative to the user's perspective. It will be further understood that the binocular viewing subsystem 104 can be arranged to provide either two separate exit pupils, or alternatively one large exit pupil extending over both eyes of the user.

The display module 118 can be implemented in any manner known to one of ordinary skill in the art to include a display subsystem 124 which presents a graphic or textual image for viewing through the binocular viewing subsystem 104. Examples of suitable display subsystems include, but are not limited to a liquid crystal panel, cathode ray tube, modulated scanning light or electron beam, or a relayed image thereof. Further, the display module 118 may also or alternatively include apparatus/circuitry which facilitates the viewing of either stationary or moving film images through the binocular subsystem 104. Note that while the display module 118 may comprise two separate display subsystems 124, one for each eye, or alternatively may comprise a single large display means, it most desirably comprises only one small display to minimize cost, weight and power consumption.

In the preferred embodiment, the above described feature of providing a binocular wide field of view viewfinder is most advantageously achieved by implementing the viewing subsystem 104 in accordance with the binocular imaging system described in my copending U.S. patent application Ser. No. 08/287,967, incorporated herein by reference and specifically illustrated in FIGS. 3(a) and (b). More particularly, the viewing subsystem 104 includes a projection lens 126 to project the image from the display subsystem 124 to a folding mirror 128, which subsequently reflects the projected image to form an intermediate image proximate a combination positive Fresnel lens 130 and a reflective striped prism beam splitting surface 132. The light forming the intermediate image is partially converged by the Fresnel lens 130, split by the beam splitting surface 132 and again converged by the Fresnel lens 130 to enter two similar but distinct areas of an eye lens 134. The eye lens is focused on the intermediate image to form binocular virtual images of the object image generated by the display subsystem 124.

The fold mirror 128 is placed at or near the center of the two eye lens image areas and angled to position the objective lens 104 as well as the object image to avoid interference in the various light paths. The Fresnel lens 130 and beam splitter 132 are preferably formed on a common substrate such that the light passes through the Fresnel lens once prior to and once again after striking the reflective beam splitter. This field lens and striped beam splitter combination is of particular benefit because both structures can be compression molded into an inexpensive single structure which can then be reflection coated on the beam splitter side. However, the combined element could be replaced with a standard field lens and another form of beam splitting surface. The preferred viewing subsystem 104 of the present invention therefore provides a compact viewfinder system which is particularly advantageous because most of the components and their weight are located and/or mounted within the main housing 102 near the user's head. Such weight distribution is important in minimizing fatigue and encumbrance of the user.

With the viewing subsystem 104 arranged as shown in FIGS. 3(a) and (b), the corresponding display module 118 may include only the display subsystem 124, or alternatively may include components of the viewing subsystem 104 which would provide the most convenient functional separation between the main system housing 102 and the display module 118. In the preferred embodiment, the minimized number and complexity of components of the viewing subsystem 104 provide a low cost and low weight viewfinder capable of producing a wide field of view binocular image particularly suited for the present invention. In addition, this subsystem 104 provides a single entrance pupil and dual large exit pupils, and also an eye relief large enough for a person to use the system without removing eyeglasses.

The subsystem 104 is configured within the main housing to minimize obstructions between the user's eyes and the user's environment as seen by looking down. Such configuration may include one wherein the user must look up into the viewer to observe the wide field of view image.

The internal electronic control subsystem 108 can include any readily available circuit and supporting components to connect and control the functions of the invention while providing various options to the user as may occur to one skilled in the art of electronic image systems. User control and selection inputs are provided via an input keypad 133 or similar input device or devices. In accordance with the present invention, such options which can be controlled include, but are not limited to main system and module functional selections and adjustments provided through a selection/control menu shown on the display subsystem means 124, picture-in-picture capability to provide images both of an electronic camera image and an external electronic image, and a television tuner. Further, the control subsystem 108 may include a lock-out means which can be provided/set at the time of manufacture to electronically prevent unauthorized access to particular functions of the system 100.

As noted above, the external input/output interface 110 includes any readily available means for providing connection between the portable imaging system 100 and external input or output devices including, but not limited to external video cassette recorders, televisions, video games, computers, headphones, and power supplies. For example, the external interface can include standard electrical connectors for many typical functions of the present invention as may occur to one skilled in the art of electronic imaging systems, and/or the external interface may include a custom connector, such as a video game cartridge port, for providing external input and output functions as well as direct data access to the internal electronic system. A custom connector advantageously provides the benefit of both a consolidated single connection as well as limiting access to particular functions of the portable imaging system 100 by external devices lacking the appropriate mating connector.

The ports 112 through 116 provide both mechanical and electronic interfaces to match mating configurations on an appropriate system or accessory add-on module. When not in use i.e., when an accessory module is not mounted to the main system 100, cosmetic covers (not shown) are used to protect the respective interfaces while providing aesthetic congruity to the system housing 102. Circuitry for controlling the specific operation of each respective accessory module will be located primarily on the module itself. However, certain electronic adjustments of any accessory module may be facilitated through interactive menus provided on the display subsystem 124, as noted above.

Optional modules 118 through 122 provide common examples of desirable add-on features which lead to several fields of use for the present invention. As described above, the display module 118 preferably comprises an electronic display such as a conventional liquid crystal panel which provides video and perhaps computer generated images. The electronic camera module 120 comprises any suitable electronic camera system and supporting electronics 121 as may occur to one skilled in the art and includes video and infrared cameras. The battery and video cassette recorder module 122 comprises a compact recorder and player 136 with supporting battery 138 which may be either mounted to a mating interface port, such as located on the bottom surface of housing 102 as shown in FIG. 5, or attached to the user's belt and connected to the external input/output interface 110.

Such accessory modules may further include a video game module, a television tuner module, a system orientation tracker, such as an electronic compass, a head orientation or position tracker module, a head-mounting apparatus, or any such accessory module that may occur to one with ordinary skill in the art. It is further noted that the system orientation tracker can double as the head orientation/movement tracker when the system is used as an head mounted display.

The various system modules may either be provided with the main system to the user for easy integration, or similarly, a manufacturer may offer integrated systems for specific markets, retaining the ability to change the system only to facilitate manufacturing, in which case such modules may represent individual components responsive to a common system architecture.

Figure 4:
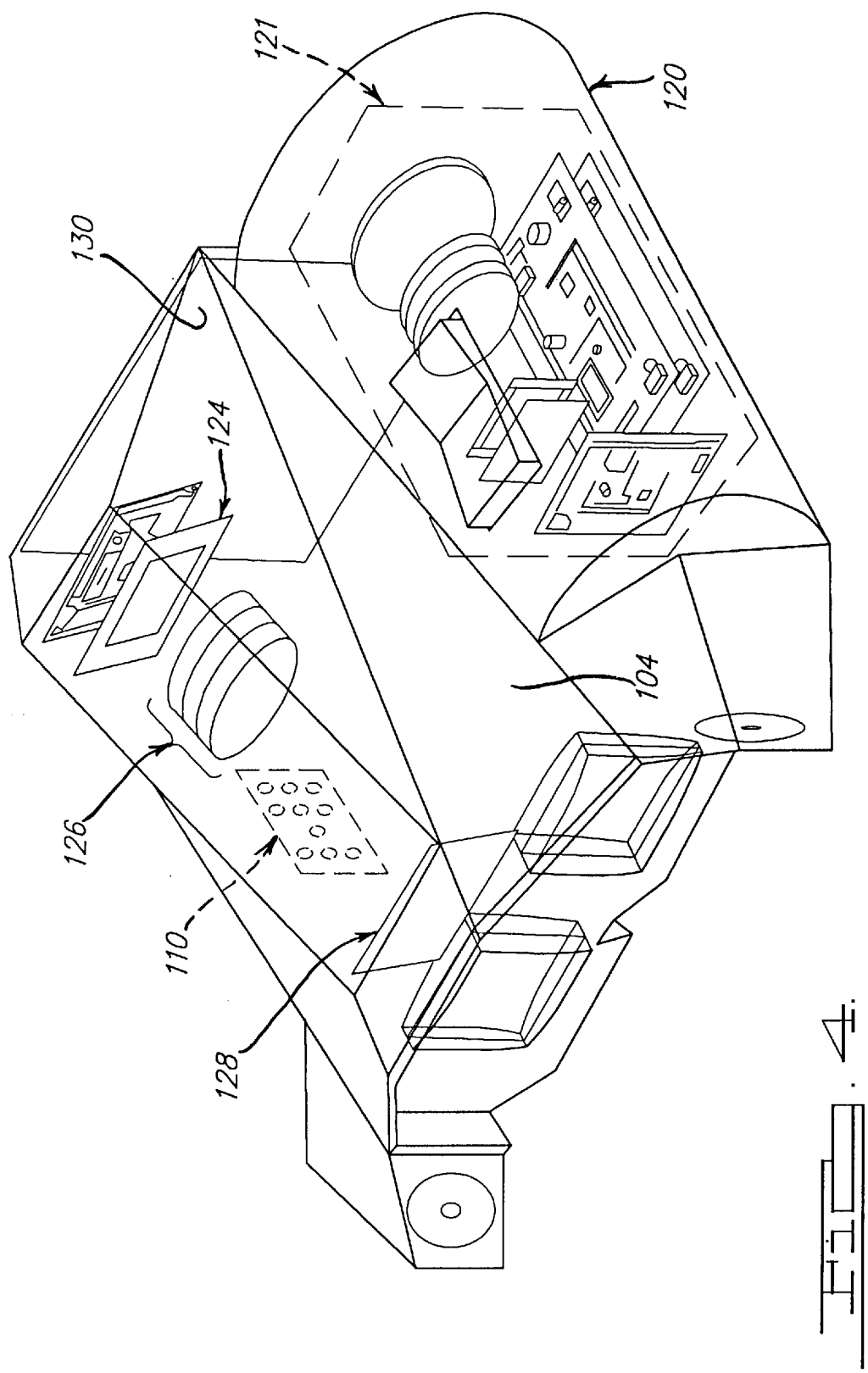
FIG. 4 is a perspective view illustrating a first optional external module coupled to the main housing in accordance with the present invention.

Therefore, in accordance with the present invention, the ability to selectively mate one or more modules with the main system's core housing 102 and viewing subsystem 104 provides a versatile design suitable for many applications. For example, in FIG. 5 the main system coupled with a camera module 120 and a video cassette recorder and battery module 122 becomes a binocular camcorder. Such a system without the cassette recorder and battery module becomes an electronic binocular camera as shown in FIG. 4. Alternatively, the main system with a head orientation tracking module and a head-mounting apparatus becomes a virtual reality display system. The main system with only the head-mounting apparatus becomes a personal large screen television viewer.

The modular aspects of invention therefore significantly reduce problems with prior art compact electronic imaging systems due to a number of reasons. First, the use of a main system and accessory modules greatly increases the utility of the system. Second, since the viewing system is common to the many configurations of the invention, it receives the benefit of a large market and subsequent resources to facilitate development and production and to reduce costs for every application, including those with smaller markets such as virtual reality and night vision systems. Third, the modular display provides for upgrading the system as display technology improves. Fourth, the resulting products can be purchased incrementally, alleviating the need for a user to face the initial higher cost of a complete system. Thus, the modular aspect of the present invention provides significant advantages even if a conventional monocular viewfinder arrangement were utilized.

Several other benefits of the invention are realized even without the advantage of the modular configuration through the unique and synergistic combination of several features. More specifically, the low cost binocular viewer with the video camera and cassette record and playback capabilities configured as shown in FIG. 5 provides an improved camcorder with several advantages over previous camcorders. First, the long eye relief of the viewer allows the comfortable use of eyeglasses. Second, the long eye relief also allows the viewer to be positioned away from the user's eyes with a shock absorbing material barrier (not shown) positioned between the forehead and the housing to increase safety. Third, the wide field of view binocular image provides a much more convenient viewfinder. Fourth, the compact housing configuration shown places the camcorder components close to the user's head, increasing the manageability of the device. Fifth, the extension of the housing beyond each eye provides a means for mounting a speaker to be heard by each ear for stereo sound. Another advantage of the invention is the natural cavity within the viewing system which, when made waterproof, increases the buoyancy of the invention to facilitate recovery from water accidents and use in water based environments. Further, by configuring the system with a large eye relief and with minimum obstructions below the viewing system, the user can effectively monitor the view within the camcorder while retaining the ability to scan nearby surroundings, thereby maintaining safety.

When the invention is configured as a camcorder without the tape record and playback module and accommodating large battery, the invention becomes essentially an electronic binocular camera with an entirely independent set of advantages over current portable electronic imaging systems. First, the binocular camera provides the convenient use and similar form of a binocular telescope for sporting events, nature study and other uses of conventional optical binoculars. Second, the camera can be combined with an integrated or external television tuner to view and listen to broadcast coverage while monitoring events through the camera using the picture-in-picture capability previously discussed. Third, the binocular camera can be attached through a standard cable to a conventional Video Cassette Recorder (VCR). This feature therefore provides a full video recording capability in any situation where a VCR exists. Since most VCRs are in the user's home, and since most recording occurs in the home, the user saves money by not having to purchase a full camcorder with a built-in VCR. Further, since the home VCR can be used for recording, there is no need to convert from the typically small tape format typical of a camcorder VCR to the standard tape format found in most home VCRs. Finally, since the VCR and large battery integral to conventional camcorders represent a significant amount of the camcorder's weight, the electronic binocular, even if connected to a portable belt-mounted VCR, provides a recording system weighing much less in the user's hands than current camcorders.

The invention therefore significantly reduces problems with prior art portable electronic imaging systems. It is understood that modifications to the invention might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A reconfigurable, portable electronic imaging system comprising:
   a base imaging subsystem comprising an electronic system control means and a viewfinder mounted within a main housing;
   a plurality of module connector ports positioned on said main housing and coupled to said electronic system control means;
   a display module connected to one of said plurality of ports which is detachable from the exterior of said main housing; and
   a plurality of optional image processing system modules which are each individually detachable from the exterior of said main housing, and when attached to the main housing, are connected to said plurality of ports, wherein each of said optional system modules produce an image from a different image source which said base imaging subsystem reimages for viewing by a system user with said viewfinder, and wherein said display module comprises a display means for generating an image within said main housing, and said viewfinder comprises a means for producing an intermediate image of the generated image, and a means for reimaging the intermediate image to produce an apparent field of view of at least 40°.

2. The system of claim 1 wherein said viewfinder comprises a binocular imaging means for reimaging the intermediate image for viewing by both of the user's eyes.

3. The system of claim 1 wherein said display means comprises a means for providing a film image within said main housing.

4. The system of claim 2 wherein said binocular imaging means comprises means for producing an eye relief suitable to accommodate a user's eyeglasses.

5. The system of claim 1 wherein said electronic system control means comprises means for processing at least two separate source images to produce a picture-in-picture output for reimaging by said viewfinder means.

6. The imaging system of claim 1 wherein said display module comprises an electronic display.

7. The system of claim 1 wherein said main housing further comprises a means for reproducing an audio signal.

8. The system of claim 7 wherein said means for reproducing an audio signal comprises stereo speakers integrally mounted to said main housing in positions proximate to the user's ears when the user is looking into said viewfinder.

9. The system of claim 1 wherein said viewfinder is positioned relative to the user's eyes to provide at least a partially unobstructed field of view below said main housing.

10. The system of claim 1 wherein said electronic system control means further comprises a means for electronically controlling each of said plurality of optional modules via a corresponding connection port.

11. The system of claim 1 wherein said main housing, said display module, and said plurality of optional modules form a waterproof assembly, and said main housing is formed with a cavity to cause floatation.

12. The system of claim 1 wherein one of said plurality of optional modules comprises a portable VCR.

13. The system of claim 1 further comprising means for mounting the main housing to a user's head.

14. The system of claim 1 further comprising means for tracking the user's head movements and orientation.

15. The system of claim 1 further comprising means for tracking physical orientation of said system relative to a fixed reference point.

16. The system of claim 1 wherein said main housing further comprises a shock absorbing material positioned at a contact point with the user's head.

17. The system of claim 1 wherein said electronic system control means comprises means for preventing unauthorized access to particular functions of said electronic system control means.

18. The system of claim 1 wherein one of said plurality of optional modules comprises a television tuner subsystem.

19. The system of claim 1 wherein one of said plurality of optional modules comprises a video game subsystem.

20. An electronic binocular imaging system comprising:
   a portable housing;
   means mounted to said housing for generating an electronic signal representative of scenery external to said housing, wherein said means for generating an electronic signal comprises a first subsystem module having a video and audio subsystem mounted thereon;
   an electronic display means supported by said housing for displaying an image representative of said electronically generated signal within said housing, wherein said display means comprises a second subsystem module having a means for reproducing the electronic signal as an image, wherein said housing comprises a first and second external port connector means which permits removable coupling of said first and second modules from the exterior of said portable housing; and a binocular viewfinder oriented with respect to said housing to permit viewing within said housing by both eyes of a user from a position external to said housing, wherein said binocular viewfinder reimages said displayed image for viewing by both eyes, said binocular viewfinder comprising imaging means for producing an apparent field of view of at least 40°.

21. The system of claim 20 wherein said means for generating an electronic signal further comprises a third subsystem module having a video cassette recorder/playback apparatus mounted thereon, and said housing comprises a third external port connector means which permits removable coupling of said third module from the exterior of said portable housing.

22. An electronic binocular imaging system comprising:

a portable housing, wherein said portable housing comprises a plurality of module connector ports which permit detachable connection of a corresponding plurality of optional system modules from the exterior of said portable housing;

means mounted to said housing for generating an electronic signal representative of scenery external to said housing;

an electronic display means supported by said housing for displaying an image representative of said electronically generated signal within said housing; and a binocular viewfinder oriented with respect to said housing to permit viewing within said housing by both eyes of a user from a position external to said housing, wherein said binocular viewfinder reimages said displayed image for viewing, by both eyes, said binocular viewfinder comprising imaging means for producing an apparent field of view of at least 40°.

23. The system of claim 22 further comprising an electronic system control means for electronically controlling each of said plurality of optional modules via a corresponding connection port.

24. The system of claim 22 wherein one of said plurality of optional modules comprises a VCR.

25. The system of claim 22 wherein one of said plurality of optional modules comprises a television tuner subsystem.

26. The system of claim 22 wherein one of said plurality of optional modules comprises a video game subsystem.

27. An electronic binocular imaging system comprising:

a portable housing, wherein said portable housing provides a waterproof assembly, and said housing is formed with a cavity to cause floatation;

means mounted to said housing for generating an electronic signal representative of scenery external to said housing;

an electronic display means supported by said housing for displaying an image representative of said electronically generated signal within said housing; and a binocular viewfinder oriented with respect to said housing to permit viewing within said housing by both eyes of a user from a position external to said housing, wherein said binocular viewfinder reimages said displayed image for viewing by both eyes, said binocular viewfinder comprising imaging means for producing an apparent field of view of at least 40°.

28. An electronic binocular imaging system comprising:

a portable housing;

means mounted to said housing for generating an electronic signal representative of scenery external to said housing;

an electronic display means supported by said housing for displaying an image representative of said electronically generated signal within said housing;

a binocular viewfinder oriented with respect to said housing to permit viewing within said housing by both eyes of a user from a position external to said housing, wherein said binocular viewfinder reimages said displayed image for viewing by both eyes, said binocular viewfinder comprising imaging means for producing an apparent field of view of at least 40°; and means for tracking the user's head movements and orientation.

29. An electronic binocular imaging system comprising:

a portable housing;

means mounted to said housing for generating an electronic signal representative of scenery external to said housing;

an electronic display means supported by said housing for displaying an image representative of said electronically generated signal within said housing;

a binocular viewfinder oriented with respect to said housing to permit viewing within said housing by both eyes of a user from a position external to said housing, wherein said binocular viewfinder reimages said displayed image for viewing by both eyes, said binocular viewfinder comprising imaging means for producing an apparent field of view of at least 40°; and means for tracking the physical orientation of said system relative to a fixed reference point.

* * * * *